US011062510B2

(12) United States Patent
Dorin et al.

(10) Patent No.: US 11,062,510 B2
(45) Date of Patent: *Jul. 13, 2021

(54) FACILITATING BODY MEASUREMENTS THROUGH LOOSE CLOTHING AND/OR OTHER OBSCURITIES USING THREE-DIMENSIONAL SCANS AND SMART CALCULATIONS

(71) Applicant: Intel Corporation, Santa Clara, CA (US)

(72) Inventors: Camila Dorin, Tel Aviv (IL); Barak Hurwitz, Kibbutz Alonim (IL); Gila Kamhi, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,380

(22) Filed: Feb. 18, 2020

(65) Prior Publication Data

US 2020/0219311 A1 Jul. 9, 2020

Related U.S. Application Data

(63) Continuation of application No. 14/954,882, filed on Nov. 30, 2015, now Pat. No. 10,565,782.

(Continued)

(51) Int. Cl.
*G06T 17/00* (2006.01)
*G06K 9/00* (2006.01)
(Continued)

(52) U.S. Cl.
CPC ............ *G06T 17/00* (2013.01); *G01B 11/022* (2013.01); *G01B 11/22* (2013.01);
(Continued)

(58) Field of Classification Search
None
See application file for complete search history.

(56) References Cited

U.S. PATENT DOCUMENTS

| 10,565,782 B2 | 2/2020 | Dorin et al. |
| 2002/0172408 A1 | 11/2002 | Veligdan |

(Continued)

FOREIGN PATENT DOCUMENTS

KR 20110023194 3/2011

OTHER PUBLICATIONS

Hasler et al., "Estimating Body Shape of Dressed Humans," Elsevier, Computers & Graphics, vol. 33, Issue 3, 2009, 6 pages.

(Continued)

*Primary Examiner* — James M Anderson, II
(74) *Attorney, Agent, or Firm* — Hanley, Flight & Zimmerman, LLC

(57) ABSTRACT

A mechanism is described for facilitating smart measurement of body dimensions despite loose clothing and/or other obscurities according to one embodiment. A method of embodiments, as described herein, includes capturing, by one or more capturing/sensing components of a computing device, a scan of a body of a user, and computing one or more primary measurements relating to one or more primary areas of the body, where the one or more primary measurements are computed based on depth data of the one or more primary areas of the body, where the depth data is obtained from the scan. The method may further include receiving at least one of secondary measurements and a three-dimensional (3D) avatar of the body based on the primary measurements, and preparing a report including body dimensions of the body based on at least one of the secondary measurements and the 3D avatar, and presenting the report at a display device.

27 Claims, 14 Drawing Sheets

Related U.S. Application Data

(60) Provisional application No. 62/211,712, filed on Aug. 29, 2015.

(51) Int. Cl.
  *G01B 11/22* (2006.01)
  *G01B 11/02* (2006.01)
  *G06T 7/62* (2017.01)

(52) U.S. Cl.
  CPC ..... *G06K 9/00201* (2013.01); *G06K 9/00362* (2013.01); *G06T 7/62* (2017.01); *G06K 2209/40* (2013.01); *G06T 2207/10028* (2013.01)

(56) References Cited

U.S. PATENT DOCUMENTS

| | | | |
|---|---|---|---|
| 2010/0111370 A1 | 5/2010 | Black et al. | |
| 2013/0312273 A1 | 11/2013 | Tulin | |
| 2014/0340479 A1 | 11/2014 | Moore et al. | |
| 2015/0134493 A1 | 5/2015 | Su et al. | |
| 2017/0061683 A1 | 3/2017 | Dorin et al. | |

OTHER PUBLICATIONS

International Searching Authority, "International Preliminary Report on Patentability," issued in connection with PCT Application No. PCT/US2016/041201, dated Mar. 6, 2018, 9 pages.

International Searching Authority, "Search Report and the Written Opinion," issued in connection with PCT Application No. PCT/US2016/041201, dated Sep. 12, 2016, 11 pages.

United States Patent and Trademark Office, "Final Office Action," issued in connection with U.S. Appl. No. 14/954,882, dated Apr. 15, 2019, 10 pages.

United States Patent and Trademark Office, "Non-Final Office Action," issued in connection with U.S. Appl. No. 14/954,882, dated Aug. 10, 2017, 12 pages.

United States Patent and Trademark Office, "Non-Final Office Action," issued in connection with U.S. Appl. No. 14/954,882, dated Sep. 19, 2018, 12 pages.

United States Patent and Trademark Office, "Notice of Allowance," issued in connection with U.S. Appl. No. 14/954,882, dated Sep. 11, 2019, 8 pages.

FACILITATING BODY MEASUREMENTS THROUGH LOOSE CLOTHING AND/OR OTHER OBSCURITIES USING THREE-DIMENSIONAL SCANS AND SMART CALCULATIONS

CROSS REFERENCE TO RELATED APPLICATIONS

This application is a Continuation of U.S. patent application Ser. No. 14/954,882, filed Nov. 30, 2015 and claims priority to U.S. Provisional Patent Application No. 62/211,712, Aug. 29, 2015, the contents of which are incorporated herein by reference.

FIELD

Embodiments described herein generally relate to computers. More particularly, embodiments relate to facilitating body measurements through loose clothing and/or other obscurities using three-dimensional (3D) scans and smart calculations.

BACKGROUND

With increasing use of mobile computing devices, users seek convenience, accuracy, and speed in their tasks; however, not all conventional techniques meet the users' various expectations. For example, conventional techniques do not provide for accurate or precise body measurements, such as through loose clothing, etc., and are regarded as inefficient, cumbersome, and prone to human errors.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
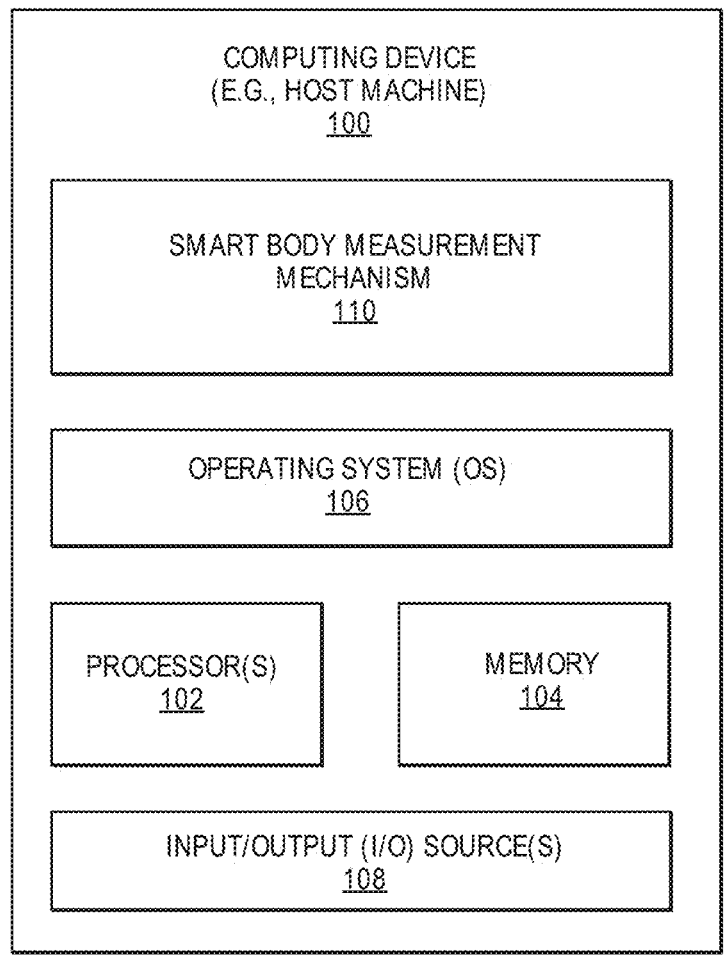
FIG. 1 illustrates a computing device employing a smart body measurement mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for computing a person's body dimensions using a single 3D scan regardless of the type or amount of clothes the person may be wearing. For example, accurate measurements may be obtained from a single full scan of the person's body even when the person is wearing one or more layers of loose or obstructing clothes. For example, in one embodiment, measurements of a user's various body parts or areas (e.g., chest, waist, low hip, etc.), regarded and referenced as primary body parts, may be obtained even if the relevant body parts/areas are not clearly visible due to, for example, the user wearing loose clothes, where these measurements, regarded and referenced as primary measurements, may then be converted into or used to obtain a entire set of detailed body measurements, regarded and referenced as secondary measurements, relating to any number and type of body parts of the user's body. Further, the primary measurements and/or secondary measurements may be used to form a 3D avatar of the user's body.

In one embodiment, a user's body may be scanned using a depth-sensing camera through the user's clothing, such as pants, skirt, shirt, t-shirt, dress, etc., that may be large or loose enough to obscure certain parts of the user's body, such as waist, where the scan may be used to obtain basic measurements relating to the user's body, such as height, chest size, waist size, low hip size, etc. Further, an application programming interface (API), such as an open source API, may be used to input the computed measurement values along with one or more additional inputs relating to the user, such as gender, weight, etc., to obtained detailed secondary measurements. For example, detailed secondary measurements/outputs may be obtained using a few primary measurements/inputs, where the secondary measurements may provide any number of measurements values relating to the user's body, such as over 50 measurement values relating to various parts of the body, along with producing a 3D avatar of the body.

In one embodiment, an accurate scanned 3D model of a user's body may be obtained using one or more of depth sensors, depth-sensing cameras (e.g., Intel® RealSense™, etc.), ranging cameras, red-green-blue and depth (RGB-D) cameras, time-of-flight (ToF) cameras, etc. It is contemplated that a 3D human scan may be performed with precise measurements having n impact in various areas, such as with multiple applications serving any number of purposes, such as online shopping (for clothing, etc.), fitness, healthcare, animation, etc. For example, the final 3D avatar and/or the secondary measurements may be shared with the user's doctor for health purposes, a trainer for fitness purposes, a tailor to custom-fit a suit, a retailer for online clothes shopping, or simply with family and friends, etc.

Since loose clothes can conceal or disguise the accuracy of bodily dimensions, conventional techniques require users to wear extremely tight clothes or even worse, pose naked, which can compromise the user's privacy. Even if the measurements are obtained, conventional techniques are known for averaging such measurements (as opposed to computing them), leading to inaccuracies and inefficiencies. Thus, conventional measurements are regarded inaccurate, inefficient, cumbersome, and even intrusive since may of these techniques require users to wear tight clothes (particularly around certain body parts, such as hips, waist), pose naked, or make strange and awkward poses, etc. Moreover, conventional techniques require a large number of takes of the user's body using multiple cameras.

Embodiments offer a novel technique for performing bodily measurements using a single 3D scan, allowing users to have a more comfortable experience and use the resulting 3D avatars with any number and type of software applications, such as shopping applications, tailoring applications, fitness applications, heath applications, etc.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to body dimensions, measurements, tracking, progress, 3D models/avatars, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

Figure 2:
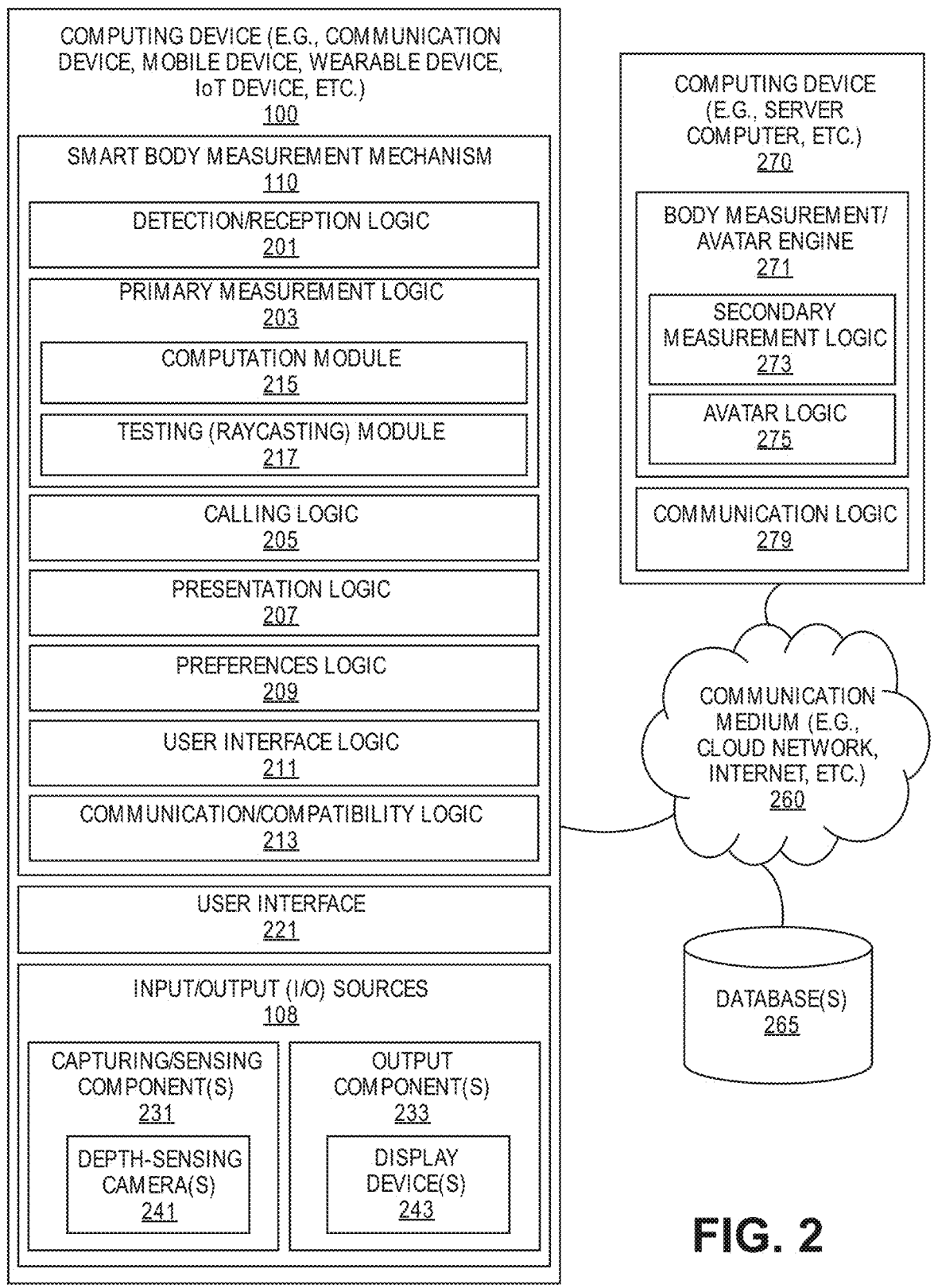
FIG. 2 illustrates a smart body measurement mechanism according to one embodiment.

FIG. 1 illustrates a computing device 100 employing a smart body measurement mechanism 110 according to one embodiment. Computing device 100 serves as a host machine for hosting smart measurement measurement mechanism ("smart measurement mechanism", "body measurement mechanism", "body mechanism", or simply "measurement mechanism") 110 that includes any number and type of components, as illustrated in FIG. 2, to facilitate dynamic and real-time accurate measurement of body dimensions despite any obstacles or barriers (e.g., loose clothing, etc.), as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, such as Google® glass™, head-mounted binoculars, gaming displays, military headwear, etc.), and other wearable devices (e.g., smartwatches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a person or a group of individuals or persons using or having access to computing device 100.

FIG. 2 illustrates a smart body measurement mechanism 110 according to one embodiment. In one embodiment, smart measurement mechanism 110 may include any number and type of components, such as (without limitation): detection/reception logic 201; primary measurement logic 203 including computation module 215 and testing (raycasting) module 217; calling logic 205; presentation logic 207; preferences logic 209; user interface logic 211; and communication/compatibility logic 213. Computing device 100 (e.g., smartphone, tablet computer, smart wearable device, etc.) is further shown as providing user interface 221, as facilitated by user interface logic 211, and hosting input/output sources 108 having capturing/sensing components 231 and output sources 233, where capturing/sensing components 231 include one or more cameras, such as depth-sensing camera(s) 241 (such as Intel® RealSense™, etc.), and output components 233 may include one or more display screens/devices, such as display device 243. Computing device 270 (e.g., server computer on cloud) includes body measurements/avatar engine 271 and communication logic 277, where body measurements/avatar engine 271 includes secondary measurement logic 273 and avatar logic 275.

In one embodiment, smart measurement mechanism 110 may be hosted by computing device 100, such as a communication/data processing device including a mobile computer (e.g., smartphone, tablet computer, etc.), a wearable computers (e.g., wearable glasses, smart bracelets, smartcards, smart watches, HMDs, etc.), an Internet of Things (IoT) devices, and/or the like. In another embodiment, computing device 100 may be a larger communication machine, such as a server computer, a desktop computer, a laptop computer, etc. In one embodiment, computing device 100 may be in communication with one or more other computing devices, such as computing device 270 (e.g., server computer, cloud-based server computer, etc.), over communication medium 260 (e.g., one or more networks, such as a cloud network, the Internet, a proximity network, such as Bluetooth, etc.).

For example and in one embodiment, computing device 100 may serve as a server computer hosting smart measurement mechanism 110 in its entirety while communicating one or more services offered by smart measurement mechanism 110 with one or more personal/client devices (e.g., smartphones, tablet computers, smart wearable devices, etc.) over communication medium 260, such as a cloud network. In another embodiment, server computer 270 may serve as the host computer for hosting smart measurement mechanism 110 to provide relevant services to one or more personal devices, such as computing device 100.

Computing device 100 may include I/O source(s) 108 including capturing/sensing components 231 and output components 233 which, as will be further described below, may also include any number and type of components, sensor arrays, detectors, displays, etc. For example, capturing/sensing components 231 may include (without limitation) two-dimensional (2D) cameras, three-dimensional (3D) cameras, sensor arrays, microphones, etc., while, output components 233 may include (without limitation) display screens, display/projection areas, projectors, speakers, etc. For example and in one embodiment, capturing/sensing components 231 may further include one or more depth-sensing cameras, such as Intel® RealSense™ camera, etc.

Computing devices 100, 270 may be further in communication with one or more repositories or data sources or databases, such as database(s) 265, to obtain, communicate, store, and maintain any amount and type of data (e.g., computations of primary body areas, measurements of secondary body areas, body dimensions, 3D models/avatars, recommendations, predictions, data tables, data maps, media, metadata, templates, real-time data, historical contents, user and/or device identification tags and other information, resources, policies, criteria, rules, regulations, upgrades, etc.).

In some embodiments, communication medium 260 may include any number and type of communication channels or networks, such as cloud network, the Internet, intranet, Internet of Things ("IoT"), proximity network, such as Bluetooth, etc. It is contemplated that embodiments are not limited to any particular number or type of computing devices, services or resources, databases, networks, etc.

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

As previously described, embodiments provide for obtaining body dimensions using depth/disparity information based on pictures obtained through one or more depth-sensing cameras so that any dimensions-related results, such as tracking results, making predictions, offering recommendations, etc., are accurate, precise, timely, and efficient. In one embodiment, a 3D body model may be extracted from depth/disparity information obtained using a depth-sensing camera.

It is contemplated that embodiment are not limited to any particular number or type of use case scenarios; however, one or more use-case scenarios, as shown with respect to FIGS. 3A-3E, may be discussed throughout this document for the sake of brevity, clarity, and ease of understanding but it is to be noted that embodiments are not limited as such. Further, in one embodiment, embodiments are not merely limited to humans and that they may be extended to plants, animals, etc., (such as domestic pets, wild animals, etc.) so that relevant individuals, such as botanists, zoologists, veterinarian, pet owners, etc., may choose to measure body dimensions to determine progress or lack-thereof for a variety of purposes, such as plant growth, animal diet, health, etc. However, for the sake of brevity, clarity, and ease of understanding, persons/humans and their bodily dimensions are used for discussion throughout this document but that embodiments are not limited as such. Further, throughout this document, "user" may refer to someone having access to a computing device, such as computing device 100, and may be referenced interchangeably with "person", "individual", "human", "him", "her", and/or the like.

Figure 3A:
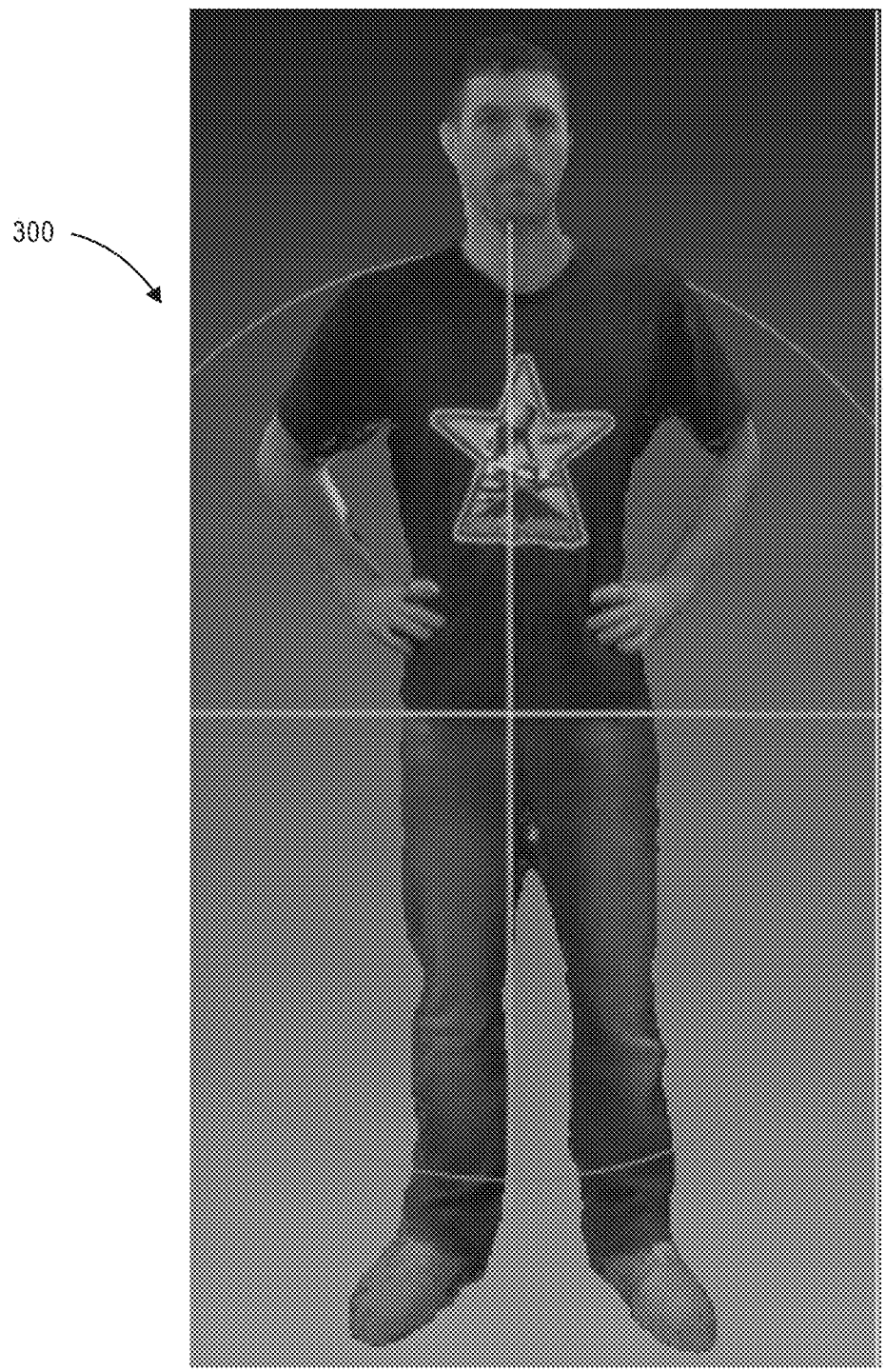
FIG. 3A illustrates a 3D model according to one embodiment.

For example, a user having access to computing device 100 may have their body scanned using RGB-D/depth-sensing camera 241 of computing device 100. It is contemplated that the user may use the camera themselves or have someone else do it for them or simply set the camera timer to click and scan the user's body in a timely manner in an office, at home, outdoors, etc., wearing their regular or loose clothes. In one embodiment, this scanning or picturing of the user's body may be obtained thorough camera 241 and detected by or received at detection/reception logic 201 to then be used for further processing. In one embodiment, a scan may be obtained by having the user stand in a particular pose that allows visualization of certain parts of the user's body, such as waist curve, as shown in FIG. 3A.

As aforementioned, in one embodiment, once the scan has been received, despite the user's clothing or other obstacles, the scan may be used to obtain basic or primary measurements (such as those of chest, waist, low hip, height, etc.) that are then used to obtained full and precise measurements of the body. In one embodiment, one or more primary measurements may be obtained from the scan using primary measurement logic 203, wherein the primary measurements may include dimensions of certain body parts or areas, such as chest, waist, low hip, and height. It is contemplated that embodiments are not limited to any one or all of chest, waist, low hip, and height and that any number and type of other body parts may be used to obtain the primary measurements using primary measurement logic 203.

For example, any depth information obtained through depth sensing camera 241 may be used by primary measurement logic 203 to obtain the primary measurements, such as chest, waist, and low hip measurements. As previously discussed, although regular clothing can create a layer of obstacle on the body and can bend in certain areas of the body, primary measurement logic 203 may still find a spot on a horizontal line that crosses a certain area of the user's body that touches or nears the skin. This spot may be referred to as a least deep point and by finding this point, primary measurement logic 203 may then estimate two half ellipses (such as front and back) for three of the primary measurements, such as chest, waist, and low hip. For example, height may represent subtraction of a minimum and maximum Y coordinates of the mesh representing the user's body. The height, being the fourth of the primary measurement, may represent subtraction of a minimum and maximum y coordinates of the mesh representing the user's body.

In one embodiment, the user may be requested to input some information, such as body weight, gender, etc., using user interface 221, where the inputted information may be detected or received by detection/reception logic 201. In some embodiments, the gender may be automatically detected using camera 241 and/or other sensors of capturing/sensing components 231, while the weight may be inputted using user interface 221.

In one embodiment, once the primary measurements are computed and any user inputs are received, secondary measurements may be performed to achieve full-scale and precise measurements of the user's body. In one embodiment, these measurements may be performed locally at computing device 100 (e.g., smartphone, tablet computer, smart wearable device, etc.), such as using smart measurement mechanism 110. For example, smart measurement mechanism 110 may include one more additional components similar to or the same as secondary measurement logic 273 and avatar logic 275 or one or more existing components, such as primary measurement logic 203, of smart measurement mechanism 110 may be used to locally achieve this conversion or advancement from having basic primary measurements and inputs to full-scale secondary measurements and an avatar (e.g., 3D model) of the user's body.

In another embodiment, as illustrated here, any secondary measurements, including formation of avatars, may be performed remotely at another computing device, such as computing device 270 (e.g., server computer, cloud-based server computer, etc.), over communication medium 260 (e.g., cloud network, Internet, etc.). It is contemplated that such measurements may be performed remotely to benefit from faster and bigger machines, such as server computers (e.g., computing device 270), over cloud (e.g., communication medium 260) than burdening a smaller device, such as a smartphone (e.g., computing device 100), having limited system resources and capabilities. It is further contemplated that embodiments are not limited as such and all measurements, primary and secondary, along with avatar forming, etc., may be performed locally at computing device 100.

In the illustrated embodiment, upon obtaining the primary measurements (e.g., chest, waist, low hip, and height, etc.) including any user-provided inputs (e.g., weight, gender, etc.), calling logic 205 may be triggered to contact body measurements/avatar engine 271 at computing device 270 to perform additional computations. For example, in one embodiment, an open source Application Programming Interface (API), such as BodyKit API, etc., may be used to feed the freshly computed primary measurements (e.g., chest, waist, low hip, and height) and any user-provided inputs (e.g., weight, gender) from smart measurement mechanism 110 to body measurements/avatar engine 271 at computing device 270 for further processing (such as to obtain full body part measurements (e.g., over 50 measurements) and a 3D avatar, etc.). Further, this calling may be supported by communication/compatibility logic 211 and communication logic 277. Upon receiving the primary measurements at body measurements/avatar engine 271, secondary measurement logic 273 is triggered to take and process the primary measurements and the user-inputted information as inputs and give out an output of secondary measurements having any number and type of measurements relating to various parts and areas of the user's body. For example, these secondary measurements may include 50 or more precise measurements of various parts or areas of the user's body, such as shoulder length, arm length, neck to waist length, head girth, wrist girth, and/or the like.

In one embodiment, once this large number of secondary measurements are computed by secondary measurement logic 273, avatar logic 275 may then be triggered to use the secondary measurements (or, in some embodiments, primary measurements or both the primary and secondary measurements) to obtain a 3D avatar of the user's body to give a realistic, accurate, and precise visual illustration of the body dimensions. These secondary measurements and the avatar are then communicated back to smart measurement mechanism 110 by communication logic 277 over communication medium 260 and are received by detection/reception logic 201 and as facilitated by communication/compatibility logic 213.

In one embodiment, the set of secondary measurements and the avatar may then be forwarded on to presentation logic 207 to prepare a presentation of the results of the scan of the user's body. For example, the user may wish to view: 1) a list of measurements for her dress tailor or a retail clothing store, such as an online store, etc.; 2) the 3D avatar along with a graph/chart of measurements showing increases/decreases for his health/fitness instructor or nutritionist; 3) only measurements of certain areas/parts, such as stomach girth, etc., of the body for his doctor or other medical personnel; and/or the like. In one embodiment, the user may access and user user interface 221, as facilitated by user interface logic 211, to enter these preferences or criteria that are then received at and processed by preferences logic 209 so that the results are prepared by presentation logic 207 in accordance with the user's preferences.

In one embodiment, these user preferences or criteria along with the set of primary measurements (e.g., chest girth, waist girth, low hip girth, height, etc.), the set of secondary measurements (full-scale measurement of various, over 50, parts/areas of the body), any user-inputted information (e.g., weight, gender, etc.) regarding body measurements, and the 3D avatar, etc., may be stored at database(s) 260. For example, upon receiving the secondary measurements and the avatar from detection/reception logic 201, presentation logic 207 may check with preferences logic 209 or simply access database(s) 260 to determine whether there are any user preferences regarding presentation of the final body measurements. If yes, presentation logic 207 may take such preferences into consideration and prepare the results such that they are in accordance with those preferences.

In one embodiment, these user-preferences-compliant results (e.g., textual list of body measurements, animated avatar of the user's body, graphical representations of the current and past measurements, audio and/or video representation of the user's body measurements, etc.) may then be forwarded on to user interface logic 211 to these results through one or more user interfaces, such as user interface 221 (e.g., Graphical User Interface (GUI)-based application interface, web browser, etc.), using one or more display devices, such as display device 243. Further, in one embodiment, the user may choose to share these results using one or more communication applications (e.g., email, short message service (SMS), instant messaging (IM), etc.) or through one or more networking websites, such as Facebook®, LinkedIn®, Twitter®, etc., as facilitated by communication/compatibility logic 213.

Referring back to primary measurement logic 203, any number and type of computation techniques may be employed to obtain and test the primary measurement that are then used to obtain any number and type of secondary measurements and one or more 3D avatars. In one embodiment, as illustrated, primary measurement logic 203 may include computation module 215 and testing (raycasting) module 217 for computation and testing of the primary measurements of the user's body. For example, with regard to the user's height, coordinate of the user's head, feet, and center of the body are found or detected through the scan as facilitated by depth-sensing camera 241 and by observing the minimum, maximum, and middle coordinates of the 3D model's bounding box as facilitated by computation module 215, the model's height may be extracted, where this height represents the user's height.

Similarly, in one embodiment, contour points of the model, representing the user's scanned body, are obtained through a raycast technique, as facilitated by computation module 215, such that raycasting of the model of the body is performed to keep those points that belong to the contour. In one embodiment, using computation module 215, a height of the model/body is split into several subunits, such as 100 subunits, while specific subunit regions are assigned to the primary body areas, such as chest, waist, and low hip. For example, waist may be defined in between the $36^{th}$ and the $39^{th}$ subunit. Further, for example, as facilitated by computation module 215, for each of the three detected body areas, such as chest, waist, and low hip, etc., an exact subunit is detected where the cloth touches the respective body part, such as: 1) with regard to the chest, the armpits and the shoulders are detected and then the chest is predicted to be a middle point between the two; 2) with regard to the waist, a smallest distance between the contour points in a subunit range is detected; and 3) with regard to the low hip, most prominent points around the buttock area are detected. For example, the two contour points for each area of the body may be stored, where the mid-point between the contour points may be referred to as m.

In one embodiment, for each of the three subunits (e.g., chest, waist, and low hip), a raycast may be applied in order to extract all body points in that subunit as facilitated by testing module 217. This is performed on the front and on the back (such as after rotating the body), where, as seen in FIG. 3C, various lines are the raycast obtained for each body part on the front of the body and various points are contour points for each part. Further, for example, as facilitated by testing module 217, various points found by raycasting are tested to find which one of the points satisfies the least deep point (LDP) requirement, where this being the point closer to the center of the body in that particular location (e.g., chest, waist, and low hip). This is done for the front and the back of the body and the result are shown in FIG. 3D. For example, the LDP is translated in the x direction to the location of point m (e.g., center at that location), where this point is further referred to as d.

In one embodiment, as shown in FIG. 3D, two half ellipses are drawn for each part of the body, one for the front and one for the back. The contour points define the maximum diameter of the ellipse, where the distance between m and d is the small radius of the ellipse. The girths are calculated by adding the perimeter of the half ellipse for the front and the perimeter of the half ellipse for the back for each of the three girths (e.g., chest, waist, and low hip) calculated as shown in FIG. 3E.

Communication/compatibility logic 213 may be used to facilitate dynamic communication and compatibility between computing devices 100, 270, database(s) 265, communication medium 260, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "body", "body dimensions", "body measurements", "primary measurements", "secondary measurements", "3D avatar", "3D model", "body part", "body area", "scan", "depth", "depth-sensing camera", "privacy", "user", "user profile", "user preference", "user", "sender", "receiver", "personal device", "smart device", "mobile computer", "wearable device", etc., should not be read to limit embodiments to software or devices that carry that label in products or in literature external to this document.

It is contemplated that any number and type of components may be added to and/or removed from smart measurement mechanism 110 to facilitate various embodiments including adding, removing, and/or enhancing certain features. For brevity, clarity, and ease of understanding of smart measurement mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 3A illustrates a 3D model 300 of a user's body in a capture position according to one embodiment. As an initial matter, for brevity, many of the details discussed with reference to the previous FIGS. 1-2 may not be discussed or repeated hereafter. In one embodiment, 3D model 300 illustrates a capture position that refers to a user's standing position prior to having a depth-sensing camera take a scan of the user's body. As illustrated, in one embodiment, the user, while wearing regular/loose clothes, may put his hands on this waist to enhance the waist curve.

Figure 3B:
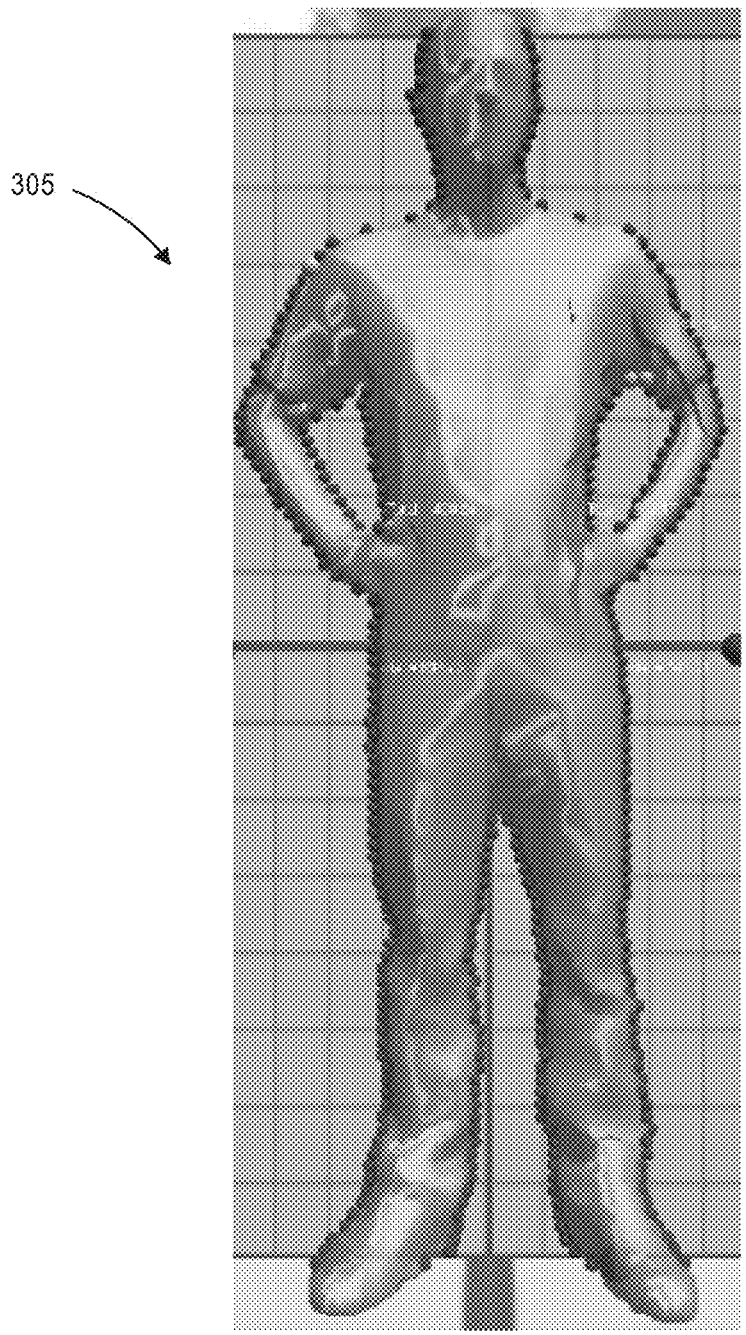
FIG. 3B illustrates a 3D model contour according to one embodiment.
Figure 3C:
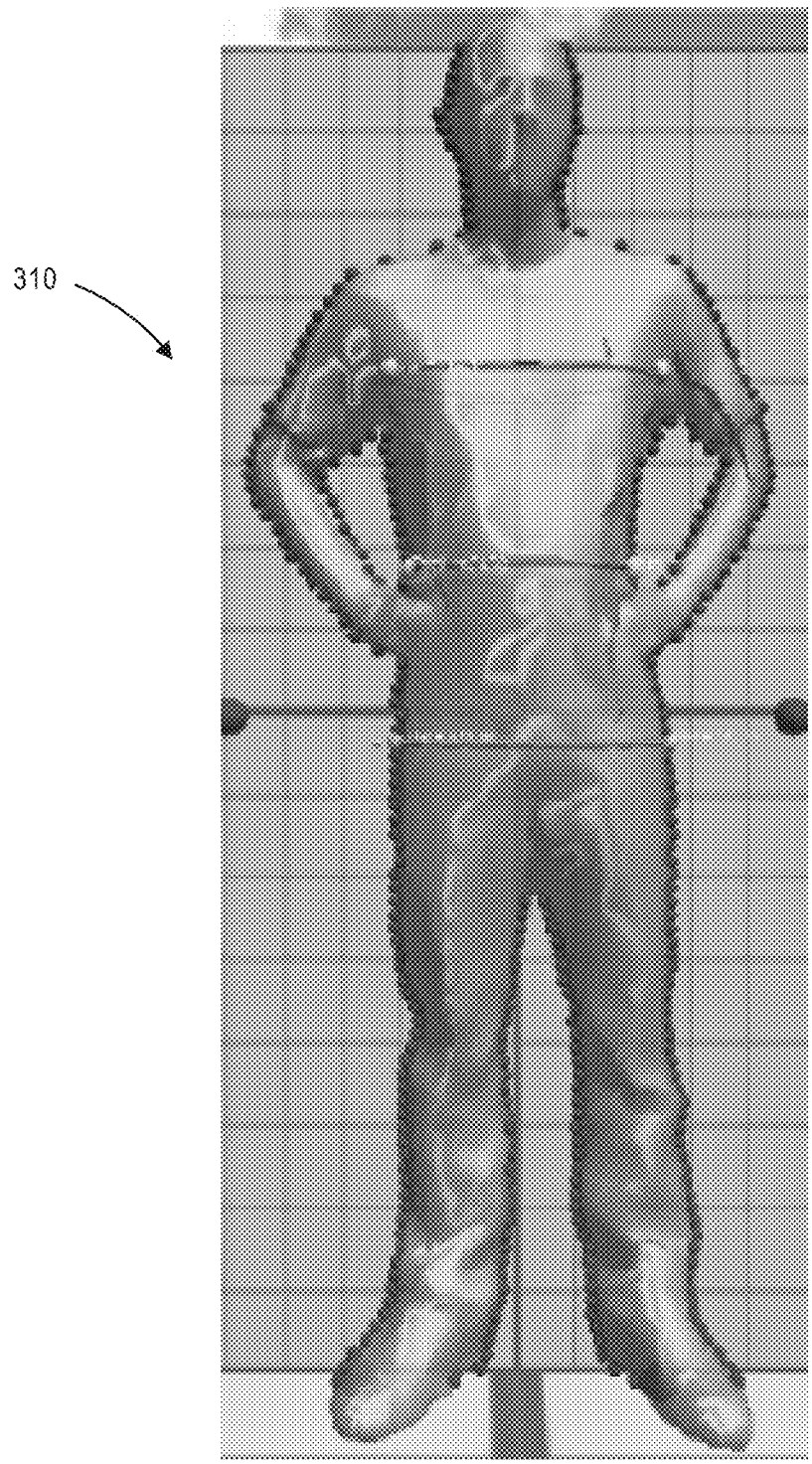
FIG. 3C illustrates a 3D model raycast according to one embodiment.
Figure 3D:
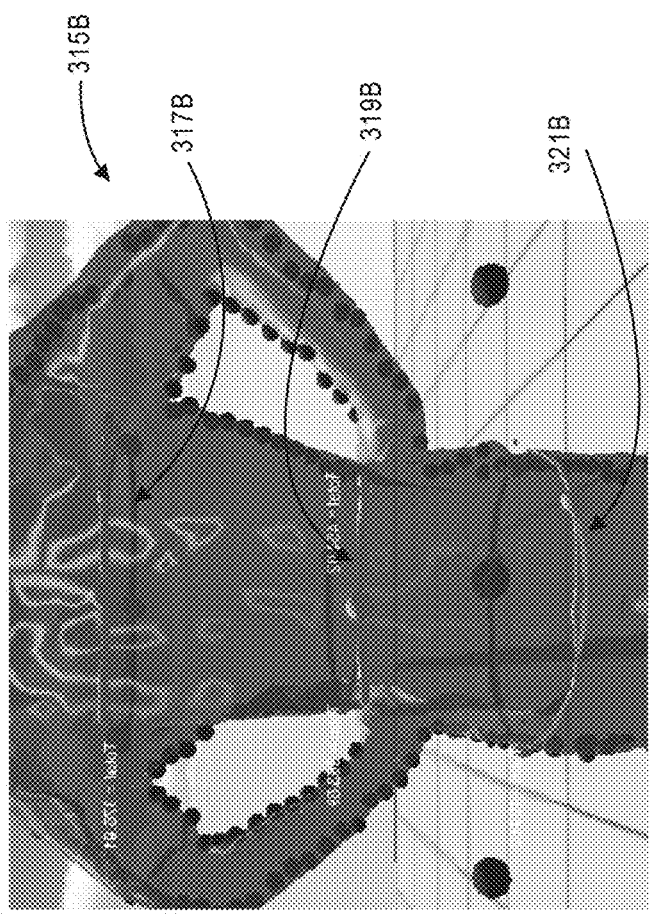
FIG. 3D illustrates raycasting results for front and back according to one embodiment.
Figure 3D:
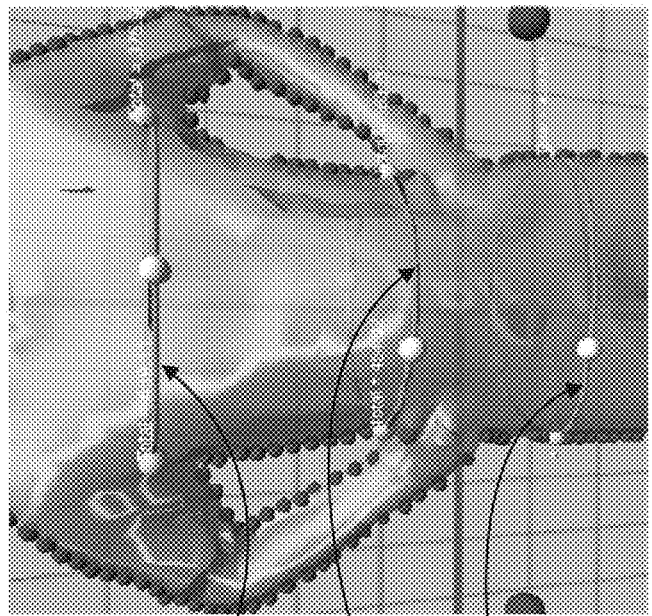
Figure 3E:
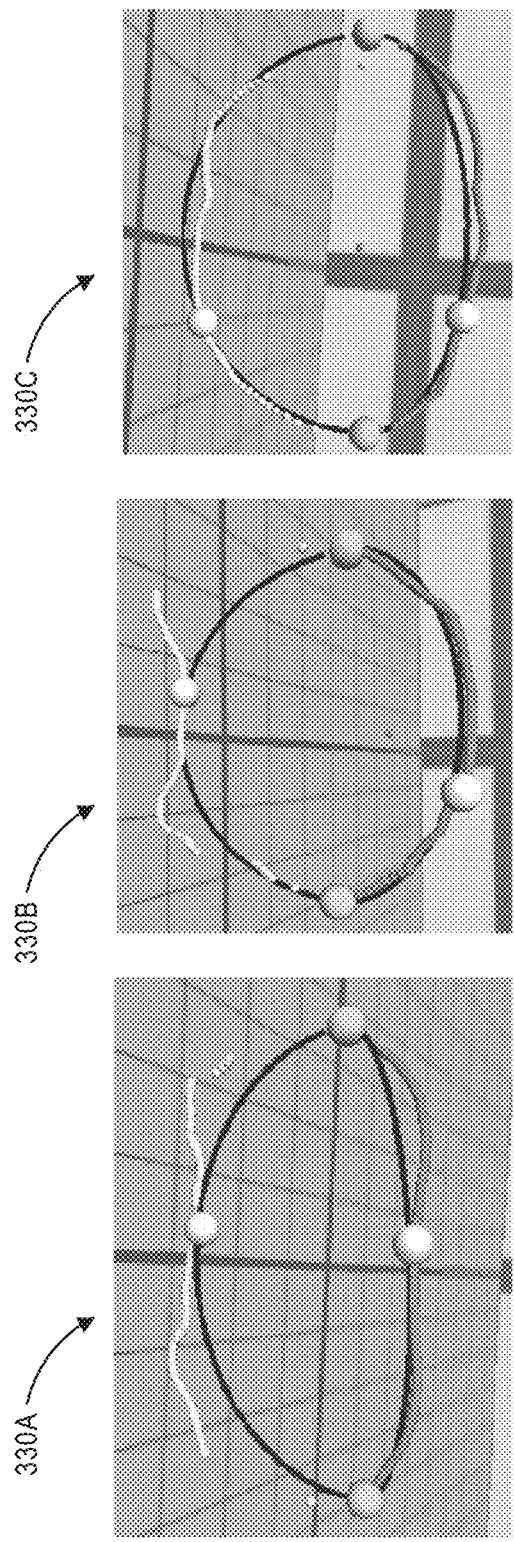
FIG. 3E illustrates half ellipses (from left to right) for chest, waist, and low hip according to one embodiment.

FIG. 3B illustrates a 3D model contour 305 according to one embodiment. As described with reference to FIG. 2, contour 305 of a user's body of FIG. 3A is obtained by performing raycasting of 3D model 300 of FIG. 3A such that only the points that belong to contour 305 are kept and maintained as shown in 3D model raycast 310 of FIG. 3C. For example the height of the user's body may be slip vertically into several subunits, such as 100 subunits, while specific subunit areas are assigned to the primary body parts, such as chest, waist, and low hope. For example, the waist may be defined as being in between $36^{th}$ and 39th subunit.

In one embodiment, as illustrated with reference to FIG. 3D, using testing module 217 of FIG. 2, points found by raycasting for each of the three primary body parts (e.g., chest, waist, and low hip) are tested to check the one point that satisfies the LDP requirement, where this point is closer or closest to the center of the body in its corresponding location (e.g., chest, waist, and low hip). This is performed for front 315A of the body having points 317A (relating to chest), 319A (relating to waist), and 321A (relating to low hip) and similarly, for back 315B of the body having points 317B (relating to chest), 319B (relating to waist), and 321B (relating to low hip). These deep points are translated in x to the location of point m, calling this point d.

Continuing with the example, FIG. 3E illustrates a set of half ellipses 330A-C according to one embodiment. For example, as illustrated, ellipse 330A includes two half ellipses representing the front and the back of the girth of the user's chest, ellipse 330B includes two half ellipses representing the front and the back of the girth of the waist, and ellipse 330C incudes two half ellipses representing the front and the back of the girth of the low hip. These sets of two half ellipses are drawn for each of the primary part of the body (e.g., chest, waist, and low hip) both for the front and the back of the user's body. The contour points on the ellipses 330A-C define the maximum diameter of the ellipse, while the distance between m and d is regarded as the small radius of the corresponding ellipse 330A-C.

Figure 4A:
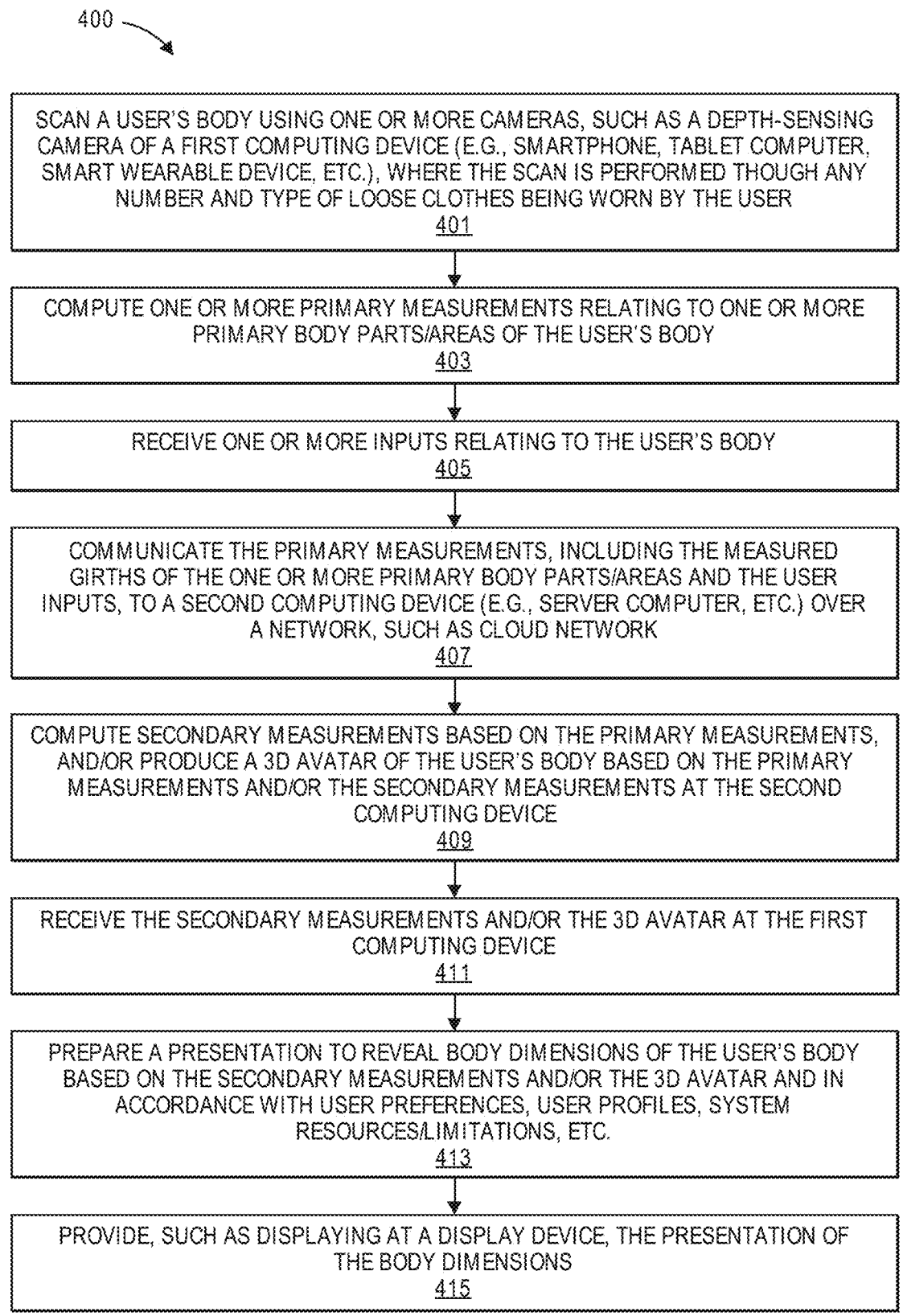
FIG. 4A illustrates a method for smart measurement of body dimensions through loose clothing or other obstacles according to one embodiment.

FIG. 4A illustrates a method 400 for smart measurement of body dimensions through loose clothing or other obstacles according to one embodiment. Method 400 may be performed by processing logic that may comprise hardware (e.g., circuitry, dedicated logic, programmable logic, etc.), software (such as instructions run on a processing device), or a combination thereof, as facilitated by smart measurement mechanism 110 and/or body measurement/avatar engine 271 of FIGS. 1-2. The processes of method 400 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 400 begins at block 401 with scanning of a user's body using one or more cameras, such as a depth-sensing camera (e.g., Intel® RealSense™ camera), of a first computing device (e.g., smartphone, tablet computer, smart wearable device, etc.). At block 403, in one embodiment, using the depth data and other relevant information from the scan, as obtained by the depth-sensing camera, one or more primary measurements relating to one or more primary body parts/areas of the user's body are computed. For example, thee primary body parts/areas may include the user's chest, waist, and low hip, where the primary measurements may include the girth or circumference of the chest, the waist, and the low hip. In one embodiment, additional primary measurements may include the user's height. At block 405, the user may be requested to input one or more values relating to the user's body, such as weight, gender, etc. It is contemplated that in some embodiments, one or more of such values, such as gender, may be automatically computed at the second computing device without having to rely on the user to input such values.

At block 407, in one embodiment, the primary measurements and the user-provided values may be communicated over to a second computing device, such as a server computer, over a communication medium, such as cloud network, for further processing, such as to obtain secondary measurements and/or a 3D avatar of the user's body. It is contemplated that in some embodiments, the secondary measurements may be computed locally at the first computing device without having to employ or engage the second computing device. However, for the sake of brevity, clarity, and ease of understanding, in one embodiment, at block 409, the primary measurements and the user-inputted values are used to compute the secondary measurements (such as a full set of measurements relating to any number and type of areas/parts of the user's body) along with the 3D avatar of the user's body.

At block 411, in one embodiment, the secondary measurements and the 3D avatar are received at the first computing device, from the second computing device, over the network. At block 413, using the secondary measurements and/or the 3D avatar, a presentation of the body measurements of the user's body is prepared such that the presentation is based on or in compliance with one or more of user preferences, user profile, system resources and/or limitations, etc. For example, the presentation may be prepared and provided in one or more formats, such as textual, numerical list, animated, graphs/charts, video, audio/video, etc., and may be expanded or restricted, as desired or necessitated, such as including all body measurements, selective measurements for tailoring, health/fitness purposes, etc. At block 415, in one embodiment, the body measurement presentation and/or shared, such as displayed on a display screen/device in communication with the first computing device, posting on a network website, transmitting to other computing devices (such as a doctor's desktop, a health fitness advisor's tablet computer, a family member's smart wearable device, the house's IoT device, etc.) through one or more communication applications (e.g., email, SMS, IM, etc.) over one or more networks (e.g., cloud network, Internet, etc.).

Figure 4B:
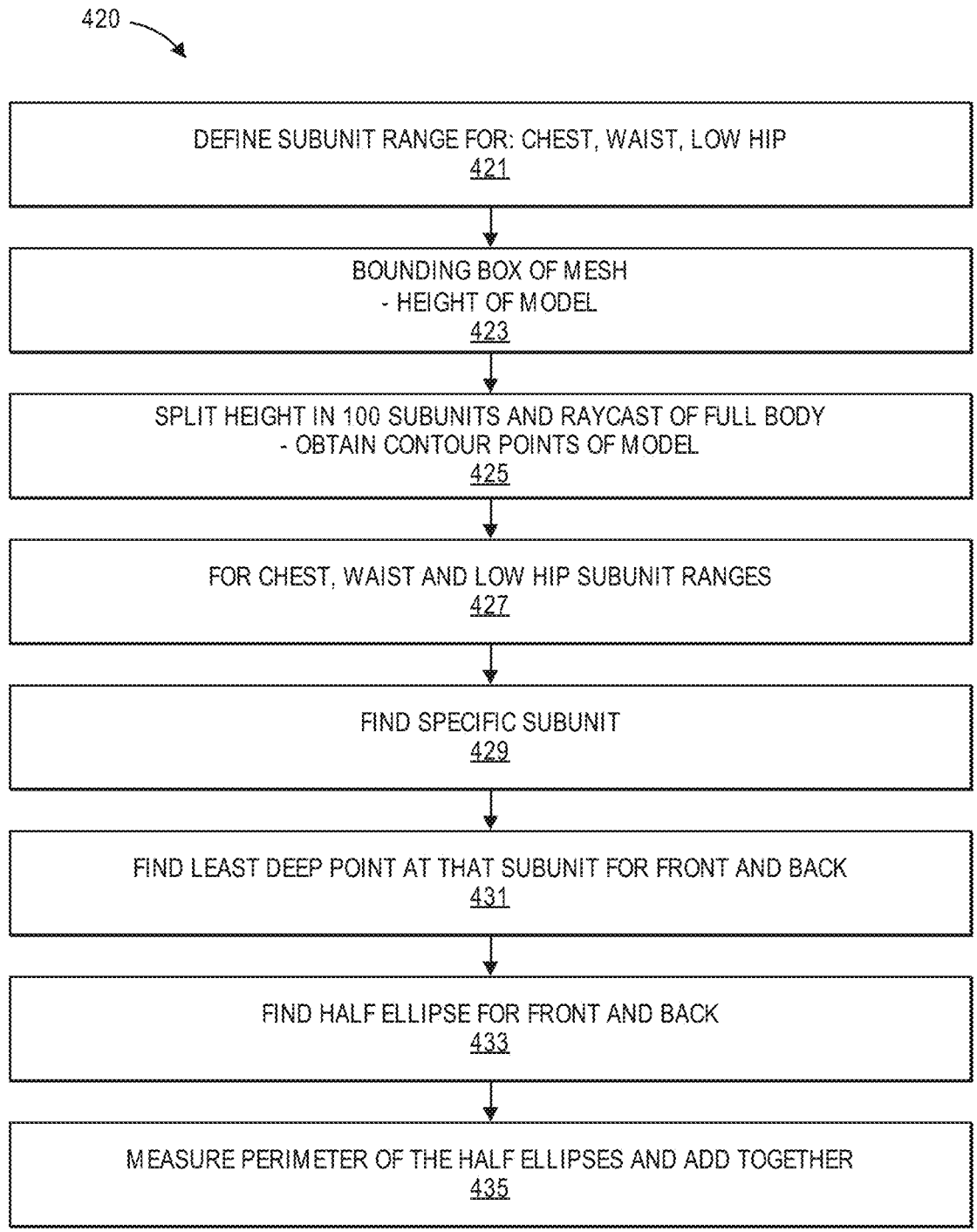
FIG. 4B illustrates a method for computing primary measurements according to one embodiment.

FIG. 4B illustrates a method 420 for computing primary measurements according to one embodiment. Method 420 may be performed by processing logic that may comprise hardware (e.g., circuitry, dedicated logic, programmable logic, etc.), software (such as instructions run on a processing device), or a combination thereof, as facilitated by smart measurement mechanism 110 and/or body measurement/ avatar engine 271 of FIGS. 1-2. The processes of method 420 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

Method 420 begins at block 421 by defining a subunit range for one or more primary body parts of a user's body, such as chest, waist, and low hip. As described with reference to FIG. 4A, a scan of the user's body may be obtained using a depth-sensing camera of a first computing device, where any depth data and other relevant information capable of being obtained from the depth scan of the user's body may be used to computing the primary measurements relating to the primary body parts such that the primary measurements are then used to obtain secondary measurements and/or a 3D avatar of the user's body, locally at the first computing device (e.g., mobile computer, smart wearable device, etc.) or remotely at a second computing device (e.g., server computer, etc.).

At block 423, in one embodiment, a bounding box of the mesh of the body is determined to obtain the user's height. At block 425, the height is then split into several subunits, such as 100 subunits, and a raycast of the full body is performed to obtain contour points of the 3D model of the body. At block 427, subunit ranges are determined for the primary body parts, such as chest, waist, and low hip. At block 429, a specific subunit is obtained for each of the primary body parts. At block 431, an LDP for each subunit is computed for both the front and the back of that specific or corresponding body part. At block 433, in one embodiment, two half ellipses (such as one half ellipse for the front and another half ellipse for the back) for each of the primary body parts are computed. At block 435, in one embodiment, perimeters of the half ellipses for each of the primary body parts are measured and added together to obtain the primary measurements.

Figure 4C:
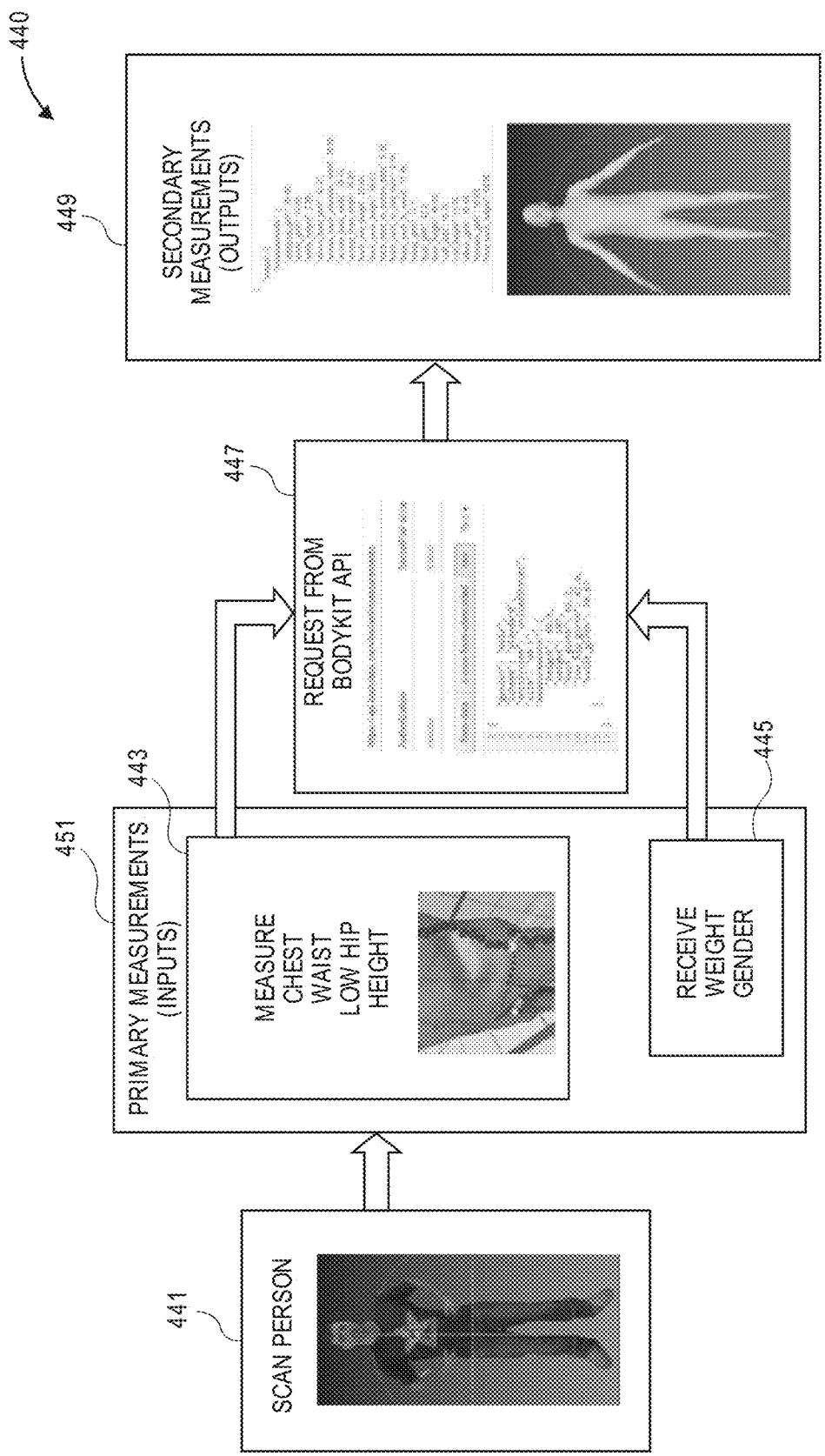
FIG. 4C illustrates a transaction sequence for smart measurement of body dimensions through loose clothing or other obstacles according to one embodiment.

FIG. 4C illustrates a transaction sequence 440 for smart measurement of body dimensions through loose clothing or other obstacles according to one embodiment. Transaction sequence 440 may be performed by processing logic that may comprise hardware (e.g., circuitry, dedicated logic, programmable logic, etc.), software (such as instructions run on a processing device), or a combination thereof, as facilitated by smart measurement mechanism 110 and/or body measurement/avatar engine 271 of FIGS. 1-2. The processes of transaction sequence 440 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

In one embodiment, as illustrated, transaction sequence 440 begins at process 441 with scanning of a user's body, such as into a scanned 3D model 300 of FIG. 3A, as facilitated by depth-sensing camera(s) 241 of FIG. 2. At a first computing device (e.g., mobile computing device, smart wearable device, etc.) primary measurements (inputs) 451 are obtained, including computing the body's chest girth, waist girth, low hip girth, and height, etc., at process 443, and receiving one or more inputs from the user, such as weight and gender, etc., at process 445. At process 447, a request or call is placed with a second computing device (e.g., server computer), over a network (e.g., cloud network), via an API, such as BodyKit API. In one embodiment, at process 449, secondary measurements (outputs) are obtained at the second computing device based on the primary measurements 451, where the secondary measurements 449 may include a full range of measurements of various parts or areas, from top to bottom, of the user's body and/or a 3D avatar of the user's body based on the primary and/or secondary measurements 451, 449. As aforementioned, it is contemplated that any secondary measurements 449 and/or 3D avatars, such as 3D avatar 481 of FIG. 4E, may be computed locally at the first computing device.

Figure 4D:
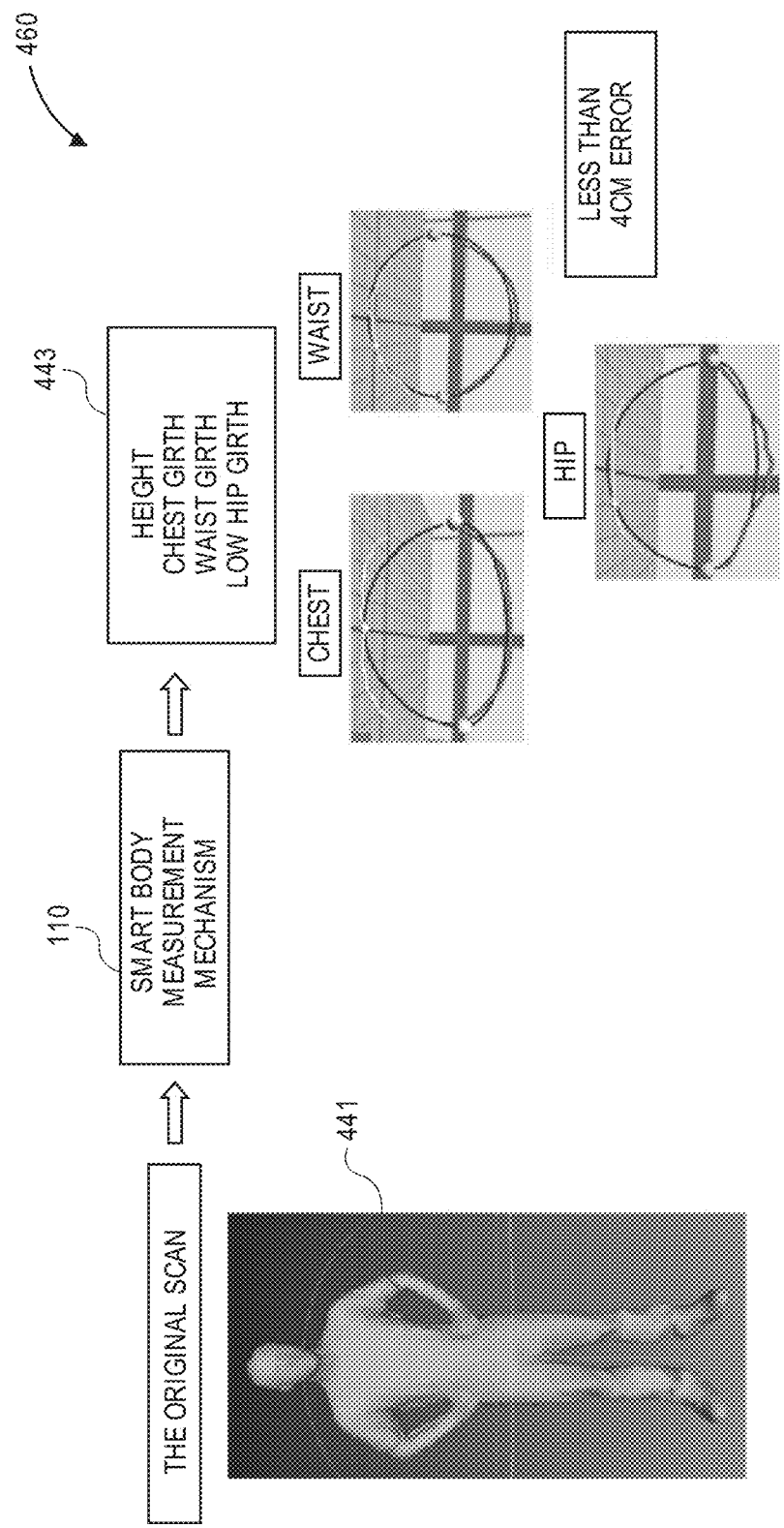
FIG. 4D illustrates a transaction sequence for computing primary measurements according to one embodiment.

FIG. 4D illustrates a transaction sequence 460 for computing primary measurements according to one embodiment. Transaction sequence 460 may be performed by processing logic that may comprise hardware (e.g., circuitry, dedicated logic, programmable logic, etc.), software (such as instructions run on a processing device), or a combination thereof, as facilitated by smart measurement mechanism 110 and/or body measurement/avatar engine 271 of FIGS. 1-2. The processes of transaction sequence 460 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

In one embodiment, as previously discussed with reference to FIG. 2, transaction sequence 460 refers to a first part of smart measurements of body dimensions of the user's body, where original scan 441 of the user's body is used by smart measurement mechanism 110 at a first computing device (e.g., mobile computers, smart wearable devices, etc.) to perform a set of measurements 443 of height, chest girth, waist girth, and low hip girth.

Figure 4E:
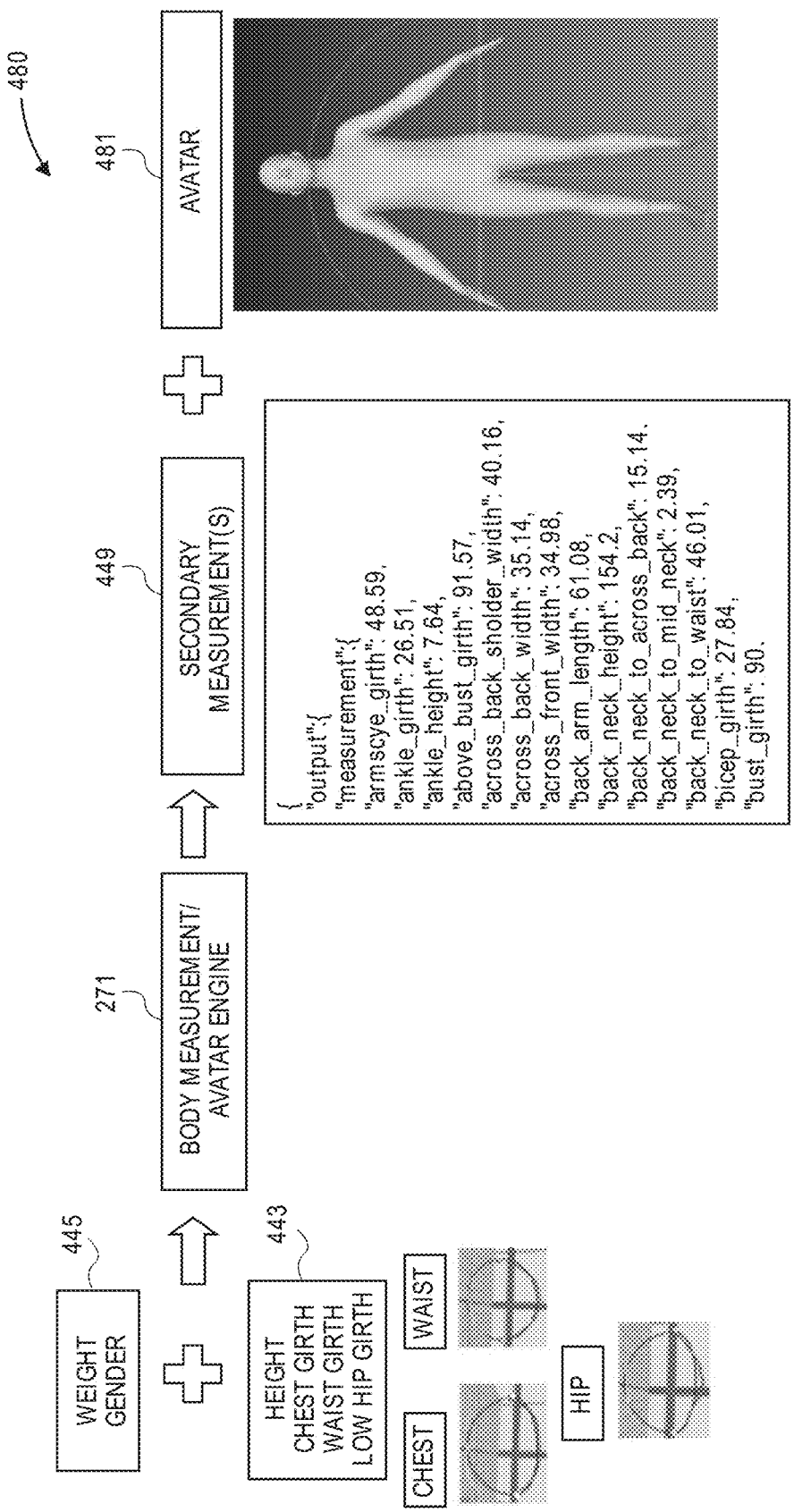
FIG. 4E illustrates a transaction sequence for computing secondary measurements and/or a 3D avatar according to one embodiment.

FIG. 4E illustrates a transaction sequence 480 for computing secondary measurements and/or a 3D avatar according to one embodiment. Transaction sequence 480 may be performed by processing logic that may comprise hardware (e.g., circuitry, dedicated logic, programmable logic, etc.), software (such as instructions run on a processing device), or a combination thereof, as facilitated by smart measurement mechanism 110 and/or body measurement/avatar engine 271 of FIGS. 1-2. The processes of transaction sequence 480 are illustrated in linear sequences for brevity and clarity in presentation; however, it is contemplated that any number of them can be performed in parallel, asynchronously, or in different orders. For brevity, many of the details discussed with reference to the previous figures may not be discussed or repeated hereafter.

In one embodiment, as previously discussed with reference to FIG. 2, transaction sequence 480 refers to a second part of smart measurements of body dimensions of the user's body, where primary measurements 451 of FIG. 4C including measurements 443 of girths (e.g., chest, waist, and low hip) and height and the received inputs (e.g., weight, gender, etc.) are forwarded onto and received at measurement/avatar engine 271 at a second computing device (e.g., server computer) to then use these measurements 443 and inputs 445 to compute a set of secondary measurements 449. In addition to secondary measurements 449, a 3D avatar, such as avatar 481, of the user's body may also be computed.

Figure 5:
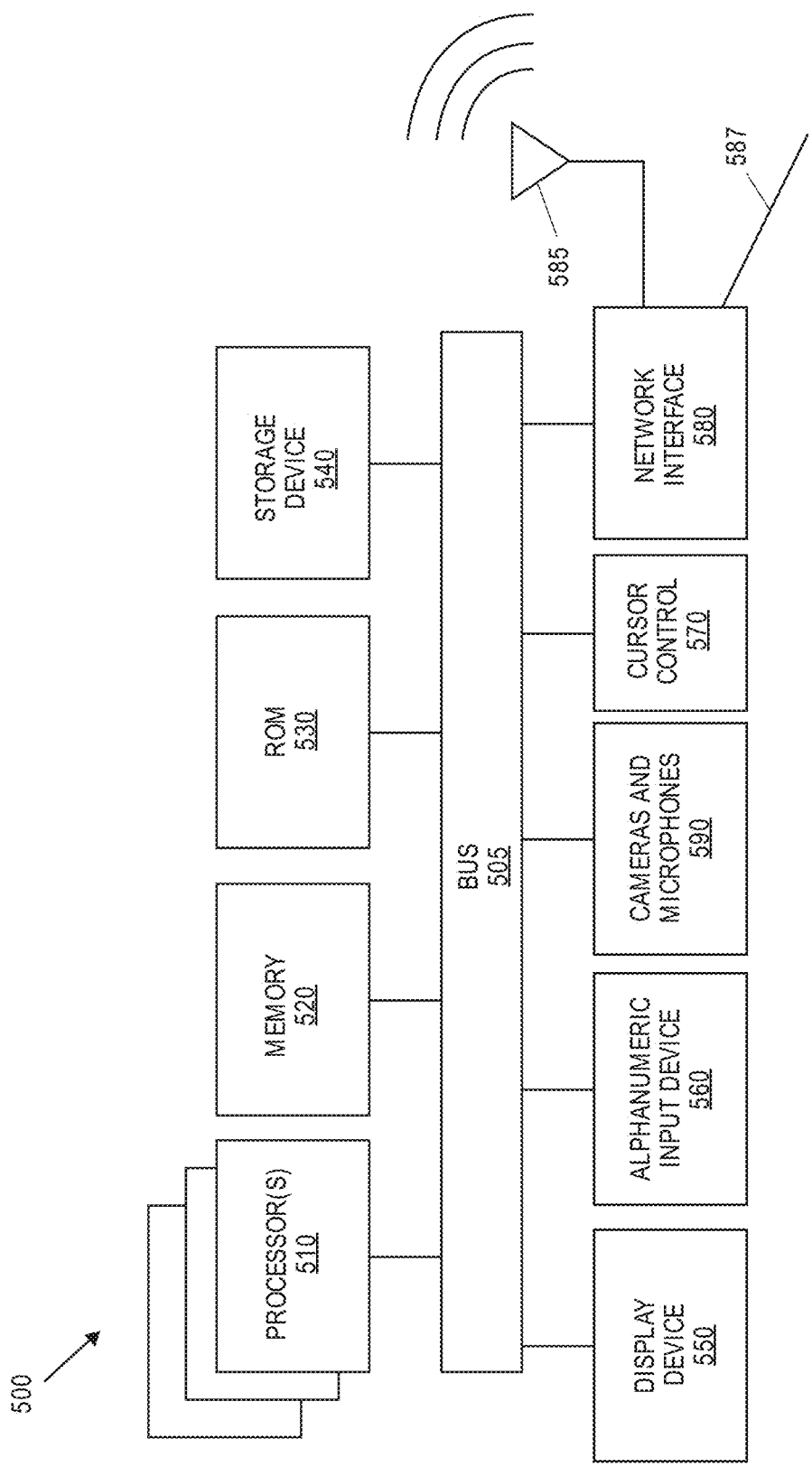
FIG. 5 illustrates computer environment suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
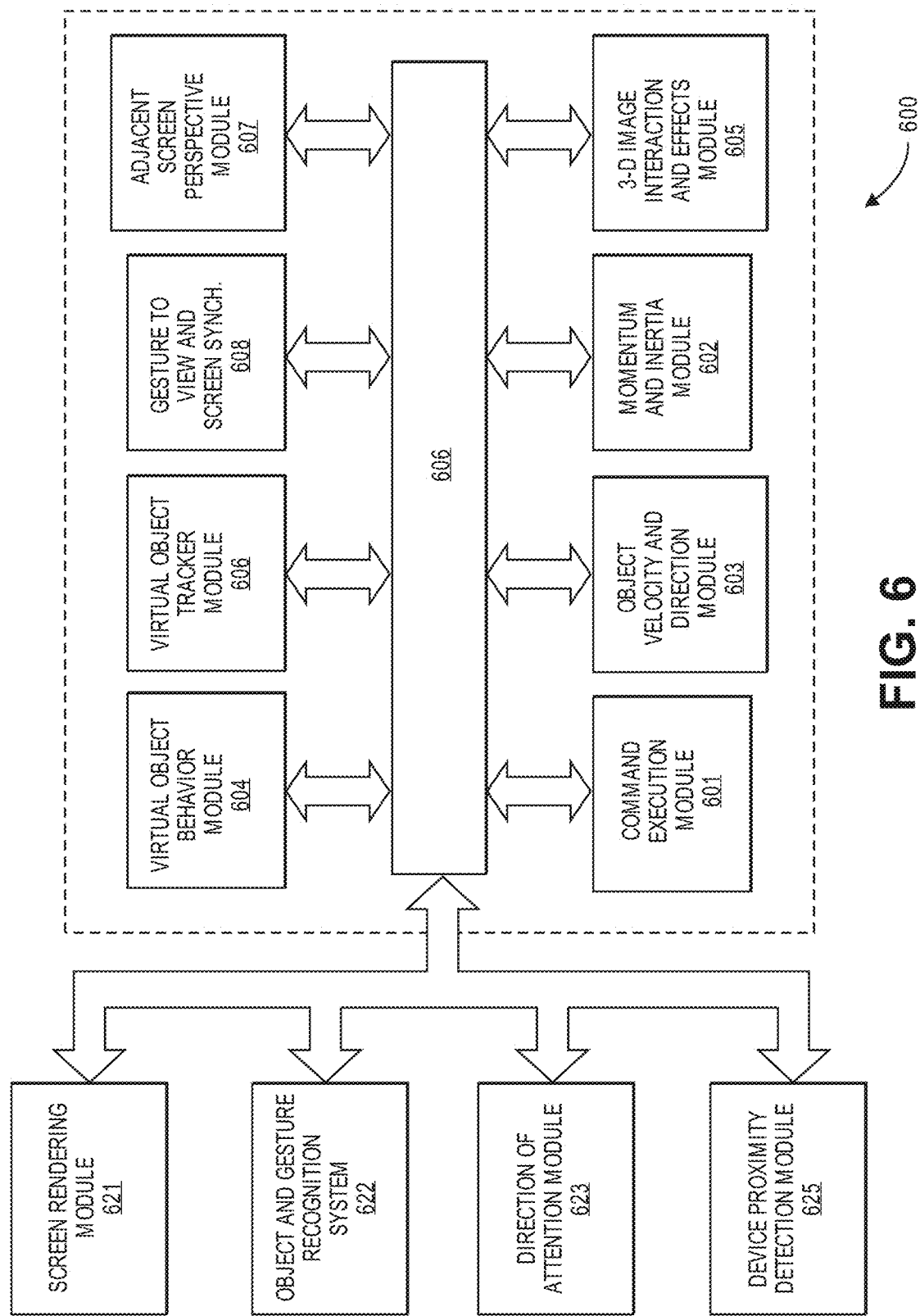
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 4.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate smart measurement of body dimensions despite loose clothing and/or other obscurities, comprising: one or more capturing/sensing components to capture a scan of a body of a user; primary measurement logic to compute one or more primary measurements relating to one or more primary areas of the body, wherein the one or more primary measurements are computed based on depth data of the one or more primary areas of the body, wherein the depth data is obtained from the scan; detection/reception logic to receive at least one of secondary measurements and a three-dimensional (3D) avatar of the body based on the primary measurements; presentation logic to prepare a report including body dimensions of the body based on at least one of the secondary measurements and the 3D avatar; and communication/compatibility logic to present the report at a display device.

Example 2 includes the subject matter of Example 1, wherein the detection/reception logic is further to detect the scan captured using the one or more capturing/sensing components, wherein the one or more capturing/sensing components include a depth-sensing camera, wherein the detection/reception logic is further to detect the depth data from the scan, wherein the scan is captured through one or more obstacles including one or more layers of clothing of the user.

Example 3 includes the subject matter of Example 1, wherein the one or more primary areas of the body comprise at least one of a chest, a waist, and a low hip of the body, wherein the one or more primary measurements include a girth of each of the chest, the waist, and the low hip, wherein the one or more primary measurements further comprise a height of the body.

Example 4 includes the subject matter of Example 1 or 3, wherein the primary measurement logic comprises computation module to compute the girth of one or more of the chest, the waist, and the low hip, and wherein the primary measurement logic further comprises a testing module to perform raycasting of one or more of the chest, the waist, and the low hip.

Example 5 includes the subject matter of Example 1, wherein the secondary measurements comprise a plurality of measurements of a plurality of areas of the body, wherein the 3D avatar comprises a 3D model of the body.

Example 6 includes the subject matter of Example 1, further comprising calling logic to call a second computing device and facilitate body measurements/avatar engine at the second computing device to process the primary measurements to obtain at least one of the secondary measurements and the 3D avatar.

Example 7 includes the subject matter of Example 1 or 6, wherein the body measurements/avatar engine comprises secondary measurement logic to compute the secondary measurements based on the primary measurements, and wherein the body measurements/avatar engine further comprises avatar logic to form the 3D avatar based on at least one of the primary measurements and the secondary measurements.

Example 8 includes the subject matter of Example 1, further comprising preferences logic to facilitate collection and management of user preferences relating to the report, wherein the user preferences to define a format of the report, wherein the format includes one or more of textual, animated, graphical, and audio/video, wherein the user preferences further define a mode of communication for the report, wherein the mode includes one or more of emailing, texting, and posting on a website.

Example 9 includes the subject matter of Example 1 or 8, wherein the presentation logic is further to access the users preferences prior to preparing the report, wherein the presentation logic is further to prepare and present the report in accordance with the user preferences.

Some embodiments pertain to Example 10 that includes a method for facilitating smart measurement of body dimensions despite loose clothing and/or other obscurities, comprising: capturing, by one or more capturing/sensing components of a computing device, a scan of a body of a user; computing one or more primary measurements relating to one or more primary areas of the body, wherein the one or more primary measurements are computed based on depth data of the one or more primary areas of the body, wherein the depth data is obtained from the scan; receiving at least one of secondary measurements and a three-dimensional (3D) avatar of the body based on the primary measurements; preparing a report including body dimensions of the body based on at least one of the secondary measurements and the 3D avatar; and presenting the report at a display device.

Example 11 includes the subject matter of Example 10, further comprising detecting the scan captured using the one or more capturing/sensing components, wherein the one or more capturing/sensing components include a depth-sensing camera, wherein the depth data is detected from the scan, wherein the scan is captured through one or more obstacles including one or more layers of clothing of the user.

Example 12 includes the subject matter of Example 10, wherein the one or more primary areas of the body comprise at least one of a chest, a waist, and a low hip of the body, wherein the one or more primary measurements include a girth of each of the chest, the waist, and the low hip, wherein the one or more primary measurements further comprise a height of the body.

Example 13 includes the subject matter of Example 10 or 12, further comprising: computing the girth of one or more of the chest, the waist, and the low hip; and performing raycasting of one or more of the chest, the waist, and the low hip.

Example 14 includes the subject matter of Example 10, wherein the secondary measurements comprise a plurality of measurements of a plurality of areas of the body, wherein the 3D avatar comprises a 3D model of the body.

Example 15 includes the subject matter of Example 10, further comprising calling a second computing device and facilitating the second computing device for processing the primary measurements for obtaining at least one of the secondary measurements and the 3D avatar.

Example 16 includes the subject matter of Example 10 or 15, further comprising: computing the secondary measurements based on the primary measurements; and forming the 3D avatar based on at least one of the primary measurements and the secondary measurements.

Example 17 includes the subject matter of Example 10, further comprising facilitating collection and management of user preferences relating to the report, wherein the user preferences to define a format of the report, wherein the format includes one or more of textual, animated, graphical, and audio/video, wherein the user preferences further define a mode of communication for the report, wherein the mode includes one or more of emailing, texting, and posting on a website.

Example 18 includes the subject matter of Example 10 or 17, further comprising: accessing the users preferences prior to preparing the report; and preparing and presenting the report in accordance with the user preferences.

Some embodiments pertain to Example 19 includes a system comprising a storage device having instructions, and a processor to execute the instructions to facilitate a mechanism to: capture, by one or more capturing/sensing components of a computing device, a scan of a body of a user; compute one or more primary measurements relating to one or more primary areas of the body, wherein the one or more primary measurements are computed based on depth data of the one or more primary areas of the body, wherein the depth data is obtained from the scan; receive at least one of secondary measurements and a three-dimensional (3D) avatar of the body based on the primary measurements; prepare a report including body dimensions of the body based on at least one of the secondary measurements and the 3D avatar; and present the report at a display device.

Example 20 includes the subject matter of Example 19, wherein the mechanism is further to detect the scan captured using the one or more capturing/sensing components, wherein the one or more capturing/sensing components include a depth-sensing camera, wherein the depth data is detected from the scan, wherein the scan is captured through one or more obstacles including one or more layers of clothing of the user.

Example 21 includes the subject matter of Example 19, wherein the one or more primary areas of the body comprise at least one of a chest, a waist, and a low hip of the body, wherein the one or more primary measurements include a girth of each of the chest, the waist, and the low hip, wherein the one or more primary measurements further comprise a height of the body.

Example 22 includes the subject matter of Example 19 or 21, wherein the mechanism is further to: compute the girth of one or more of the chest, the waist, and the low hip; and perform raycasting of one or more of the chest, the waist, and the low hip.

Example 23 includes the subject matter of Example 19, wherein the secondary measurements comprise a plurality of measurements of a plurality of areas of the body, wherein the 3D avatar comprises a 3D model of the body.

Example 24 includes the subject matter of Example 19, wherein the mechanism is further to call a second computing device and facilitating the second computing device for processing the primary measurements for obtaining at least one of the secondary measurements and the 3D avatar.

Example 25 includes the subject matter of Example 19 or 24, wherein the mechanism is further to: compute the secondary measurements based on the primary measurements; and form the 3D avatar based on at least one of the primary measurements and the secondary measurements.

Example 26 includes the subject matter of Example 19, wherein the mechanism is further to facilitate collection and management of user preferences relating to the report, wherein the user preferences to define a format of the report, wherein the format includes one or more of textual, animated, graphical, and audio/video, wherein the user preferences further define a mode of communication for the report, wherein the mode includes one or more of emailing, texting, and posting on a website.

Example 27 includes the subject matter of Example 19 or 26, wherein the mechanism is further to: access the users preferences prior to preparing the report; and prepare and present the report in accordance with the user preferences.

Some embodiments pertain to Example 28 includes an apparatus comprising: means for capturing, by one or more capturing/sensing components of a computing device, a scan of a body of a user; means for computing one or more primary measurements relating to one or more primary areas of the body, wherein the one or more primary measurements are computed based on depth data of the one or more primary areas of the body, wherein the depth data is obtained from the scan; means for receiving at least one of secondary measurements and a three-dimensional (3D) avatar of the body based on the primary measurements; means for preparing a report including body dimensions of the body based on at least one of the secondary measurements and the 3D avatar; and means for presenting the report at a display device.

Example 29 includes the subject matter of Example 28, further comprising means for detecting the scan captured using the one or more capturing/sensing components, wherein the one or more capturing/sensing components include a depth-sensing camera, wherein the depth data is detected from the scan, wherein the scan is captured through one or more obstacles including one or more layers of clothing of the user.

Example 30 includes the subject matter of Example 28, wherein the one or more primary areas of the body comprise at least one of a chest, a waist, and a low hip of the body, wherein the one or more primary measurements include a girth of each of the chest, the waist, and the low hip, wherein the one or more primary measurements further comprise a height of the body.

Example 31 includes the subject matter of Example 28 or 30, further comprising: means for computing the girth of one or more of the chest, the waist, and the low hip; and means for performing raycasting of one or more of the chest, the waist, and the low hip.

Example 32 includes the subject matter of Example 28, wherein the secondary measurements comprise a plurality of measurements of a plurality of areas of the body, wherein the 3D avatar comprises a 3D model of the body.

Example 33 includes the subject matter of Example 28, further comprising means for calling a second computing device and facilitating the second computing device for processing the primary measurements for obtaining at least one of the secondary measurements and the 3D avatar.

Example 34 includes the subject matter of Example 28 or 33, further comprising: means for computing the secondary measurements based on the primary measurements; and means for forming the 3D avatar based on at least one of the primary measurements and the secondary measurements.

Example 35 includes the subject matter of Example 28, further comprising means for facilitating collection and management of user preferences relating to the report, wherein the user preferences to define a format of the report, wherein the format includes one or more of textual, animated, graphical, and audio/video, wherein the user preferences further define a mode of communication for the report, wherein the mode includes one or more of emailing, texting, and posting on a website.

Example 36 includes the subject matter of Example 28 or 35, further comprising: means for accessing the users preferences prior to preparing the report; and means for preparing and presenting the report in accordance with the user preferences.

Example 37 includes at least one non-transitory machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims or examples.

Example 44 includes at least one non-transitory machine-readable medium comprising a plurality of instructions, when executed on a computing device, to implement or perform a method or realize an apparatus as claimed in any preceding claims or examples.

Example 45 includes a system comprising a mechanism to implement or perform a method or realize an apparatus as claimed in any preceding claims or examples.

Example 46 includes an apparatus comprising means to perform a method as claimed in any preceding claims or examples.

Example 47 includes a computing device arranged to implement or perform a method or realize an apparatus as claimed in any preceding claims or examples.

Example 48 includes a communications device arranged to implement or perform a method or realize an apparatus as claimed in any preceding claims or examples.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   primary measurement circuitry to compute primary measurements relating to primary areas of a body of a user, the primary areas of the body including a chest, a waist, and a hip-region of the body, the primary measurement circuitry to compute the primary measurements based on depth data obtained from an optical scan of the primary areas of the body by a depth-sensing camera, the depth data including a least deep point that is at least partially defined where one or more layers of clothing contacts the user, the least deep point used to define ellipses representing girths for the primary areas of the body, the primary measurement circuitry to apply the girths for the primary areas of the body to a model to determine a plurality of secondary measurements;
   detection/reception circuitry to receive the plurality of secondary measurements and a three-dimensional (3D) avatar of the body based on the primary measurements;
   presentation circuitry to prepare a report including body dimensions of the body based on the plurality of secondary measurements and the 3D avatar; and
   communication circuitry to present the report at a display device.

2. The apparatus of claim 1, wherein the detection/reception circuitry is to detect the depth data from the optical scan.

3. The apparatus of claim 1, wherein the primary measurements include the girths of the chest, the waist, and the hip-region, the primary measurements including a height of the body.

4. The apparatus of claim 1, wherein the primary measurement circuitry includes:
   computation circuitry to compute the girth of one or more of the chest, the waist, and the hip-region; and
   testing circuitry to perform raycasting of one or more of the chest, the waist, and the hip-region.

5. The apparatus of claim 1, wherein the plurality of secondary measurements include a plurality of measurements of a plurality of areas of the body, the 3D avatar including a 3D model of the body.

6. The apparatus of claim 1, further including calling circuitry to call a second computing device and facilitate a body measurements/avatar engine at the second computing device to process the primary measurements to obtain at least one of the plurality of secondary measurements and the 3D avatar.

7. The apparatus of claim 6, wherein the body measurements/avatar engine includes:
   secondary measurement logic to compute the plurality of secondary measurements based on the primary measurements; and
   avatar logic to form the 3D avatar based on at least one of the primary measurements and the plurality of secondary measurements.

8. The apparatus of claim 1, further including preferences circuitry to facilitate collection and management of user preferences relating to the report, the user preferences to define a format of the report, the format to include one or more of textual, animated, graphical, and audio/video, the user preferences to define a mode of communication for the report, the mode to include one or more of emailing, texting, and posting on a website.

9. The apparatus of claim 8, wherein the presentation circuitry is to:
   access the user preferences prior to preparing the report; and
   prepare and present the report in accordance with the user preferences.

10. The apparatus of claim 1, wherein the optical scan is captured through one or more obstacles that include the one or more layers of the clothing of the user.

11. A method comprising:
    determining, by a computing device, one or more primary measurements relating to primary areas of a body of a user, the primary areas of the body including a chest, a waist, and a hip-region of the body of the user, the one or more primary measurements determined based on depth data obtained from an optical scan for the primary areas of the body by a depth-sensing camera, the depth data including a least deep point that is at least partially defined where one or more layers of clothing contacts the user, the least deep point used to define ellipses representing girths for the primary areas of the body, wherein the determining of the one or more primary measurements includes applying the girths for the primary areas of the body to a model to determine a plurality of secondary measurements;

receiving, by the computing device, a plurality of secondary measurements and a three-dimensional (3D) avatar of the body based on the one or more primary measurements;

preparing a report including body dimensions of the body based on the plurality of secondary measurements and the 3D avatar; and presenting the report at a display device.

12. The method of claim 11, further including detecting the optical scan captured using the depth-sensing camera, the depth data detected from the optical scan.

13. The method of claim 11, wherein the one or more primary measurements include the girths of the chest, the waist, and the hip-region, the one or more primary measurements including a height of the body.

14. The method of claim 11, further including:
determining the girth of one or more of the chest, the waist, and the hip-region; and
performing raycasting of one or more of the chest, the waist, and the hip-region.

15. The method of claim 11, wherein the plurality of secondary measurements include a plurality of measurements of a plurality of areas of the body, the 3D avatar including a 3D model of the body.

16. The method of claim 11, further including calling a second computing device and facilitating the second computing device to process the one or more primary measurements for obtaining the plurality of secondary measurements and/or the 3D avatar.

17. The method of claim 16, further including:
computing the plurality of secondary measurements based on the one or more primary measurements; and
forming the 3D avatar based on at least one of the one or more primary measurements and the plurality of secondary measurements.

18. The method of claim 11, further including facilitating collection and management of user preferences relating to the report, the user preferences to define a format of the report, the format to include one or more of textual, animated, graphical, and audio/video, the user preferences to define a mode of communication for the report, the mode to include one or more of emailing, texting, and posting on a web site.

19. The method of claim 18, further including:
accessing the user preferences prior to preparing the report; and
preparing and presenting the report in accordance with the user preferences.

20. The method of claim 11, further including:
capturing, using the depth-sensing camera, the optical scan of the body of the user.

21. A non-transitory machine-readable storage medium comprising a plurality of instructions that, when executed on a computing device, cause the computing device to:

determine one or more primary measurements relating to primary areas of a body of a user, the primary areas of the body including a chest, a waist, and a hip-region of the body of the user, the one or more primary measurements determined based on depth data of the primary areas of the body, the depth data including a least deep point that is at least partially defined where one or more layers of clothing contacts the user, the least deep point used to define ellipses representing girths for the primary areas of the body, the determining of the one or more primary measurements including applying the girths for the primary areas of the body to a model to determine a plurality of secondary measurements;

receive the plurality of secondary measurements and a three-dimensional (3D) avatar of the body based on the one or more primary measurements;

prepare a report including body dimensions of the body based on at least one of the plurality of secondary measurements and the 3D avatar; and present the report at a display device.

22. The non-transitory machine-readable storage medium of claim 21, wherein the instructions, when executed, cause the computing device to detect a scan captured using one or more capturing/sensing components, the depth data detected from the scan, the one or more primary measurements including the girth of the chest, the waist, and the hip-region, the one or more primary measurements include a height of the body.

23. The non-transitory machine-readable storage medium of claim 21, wherein the instructions, when executed, cause the computing device to:
compute the girth of one or more of the chest, the waist, and the hip-region; and
perform raycasting of one or more of the chest, the waist, and the hip-region, the plurality of secondary measurements including a plurality of measurements of a plurality of areas of the body, the 3D avatar including a 3D model of the body.

24. The non-transitory machine-readable storage medium of claim 21, wherein the instructions, when executed, cause the computing device to call a second computing device and facilitate the second computing device to process the one or more primary measurements for obtaining at least one of the plurality of secondary measurements and the 3D avatar.

25. The non-transitory machine-readable storage medium of claim 24, wherein the instructions, when executed, cause the computing device to:
compute the plurality of secondary measurements based on the one or more primary measurements; and
form the 3D avatar based on at least one of the one or more primary measurements and the plurality of secondary measurements.

26. The non-transitory machine-readable storage medium of claim 21, wherein the instructions, when executed, cause the computing device to facilitate collection and management of user preferences relating to the report, the user preferences to define a format of the report, the format to include one or more of textual, animated, graphical, and audio/video, the user preferences to define a mode of communication for the report, the mode to include one or more of emailing, texting, and posting on a website.

27. The non-transitory machine-readable storage medium of claim 26, wherein the instructions, when executed, cause the computing device to:

access the user preferences prior to preparing the report; and prepare and presenting the report in accordance with the user preferences.

\* \* \* \* \*